United States Patent [19]
Hess

[11] 3,855,971
[45] Dec. 24, 1974

[54] COMBINATION GRANARY AND FEEDER FOR LIVESTOCK

[76] Inventor: Rollie O. Hess, R.F.D. 3, Moulton, Iowa 52572

[22] Filed: Dec. 27, 1973

[21] Appl. No.: 428,788

[52] U.S. Cl.............................. 119/52 AF, 119/16
[51] Int. Cl.............................................. A01k 5/02
[58] Field of Search .......... 119/52 AF, 53, 56 R, 16

[56] References Cited
UNITED STATES PATENTS

| | | | |
|---|---|---|---|
| 2,704,051 | 3/1955 | Heiskell............................ | 119/16 X |
| 3,042,000 | 7/1962 | McMurray et al.................... | 119/20 |
| 3,066,649 | 12/1962 | Geerlings.......................... | 119/53 X |

Primary Examiner—Hugh R. Chamblee
Attorney, Agent, or Firm—Clarence A. O'Brien & Harvey B. Jacobson

[57] ABSTRACT

A feed handling structure formed of prefabricated sections and defining an enlarged storage bin or granary incorporating a full length feeding bottom discharging to a livestock feed trough and selectively usable centrally located discharge auger. A distributing auger overlies the bin along the length thereof and a vertical discharge auger extends between corresponding ends of the top and bottom augers. An outwardly directed discharge chute extends from the upper portion of the vertical discharge auger.

12 Claims, 8 Drawing Figures

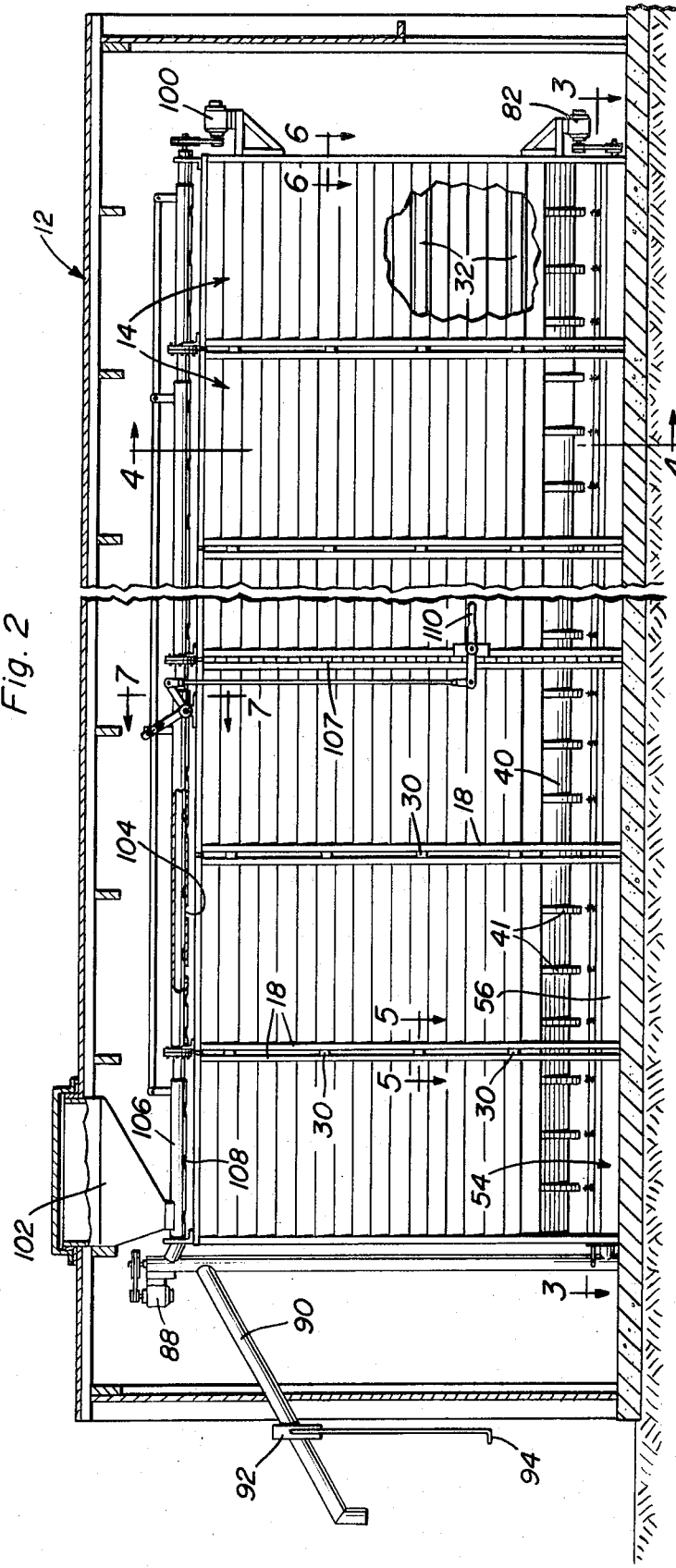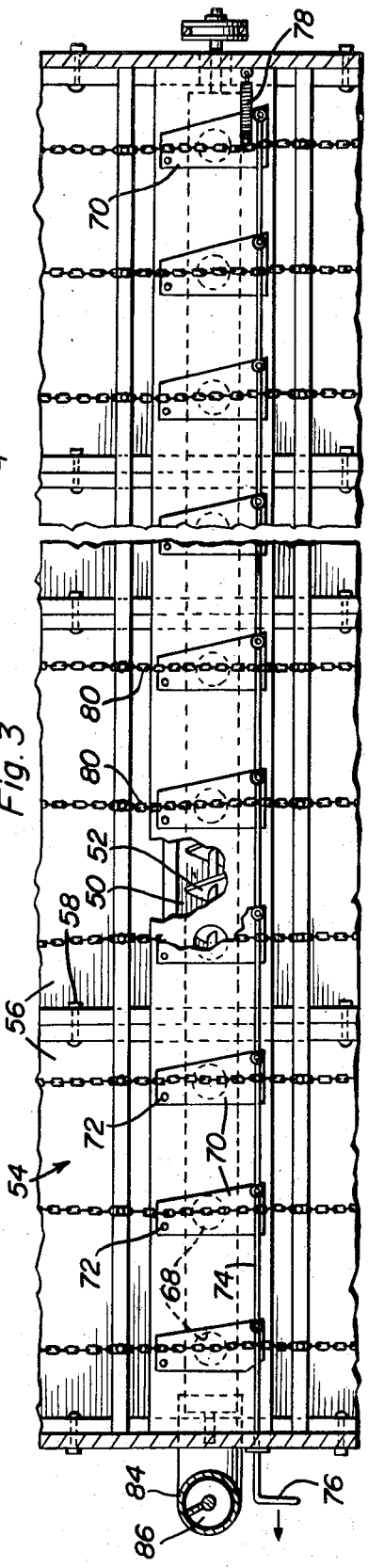

COMBINATION GRANARY AND FEEDER FOR LIVESTOCK

The present invention relates to new and useful improvements in feed handling structures and equipment for livestock.

Basically, the invention herein comprises a combined granary and feeder structure capable of storing large amounts of grain, corn or the like in the manner of a conventional granary, while at the same time uniquely providing for a direct feeding of livestock without requiring movement of the feed to remote feeders.

Specific means are provided for efficiently introducing the feed to the bin, removing the feed for an outward discharge thereof or providing for any desired redistribution of the feed along the length of the granary forming bin. In this manner, a substantial degree of versatility is achieved not only in the incorporation of a feeder within the basic construction itself, but also in the unqiue manner of handling the bin received feed.

Basically, the structure incorporates a bin underlying feed trough in conjunction with a bin underlying discharge auger with simple although highly unique control means being operable for selectively introducing the feed either to the feeder troughs or to the discharge auger.

The overall construction is, although highly unique, relatively simple and economically feasible, reliance being had primarily on bolt together prefabricated sections easily dismantled for relocation as desired.

The overall handling system for the feed is highly efficient and trouble free in operation, requiring no elaborate controls or manipulative procedures.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is a side elevational view of the combination granary and feeder;

FIG. 3 is a longitudinal sectional view taken substantially on a plane passing along line 3—3 in FIG. 2;

Figure 1:
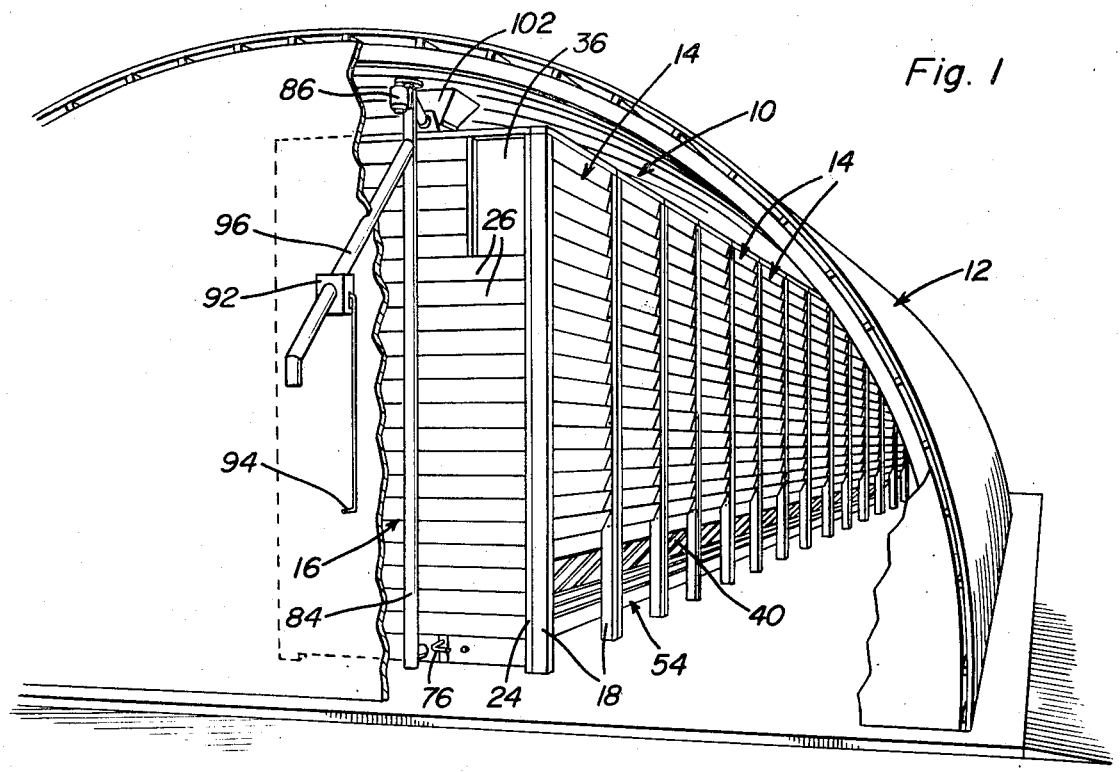
FIG. 1 is a perspective view of the feed handling structure and a protective barn-like enclosure therefor.

Referring now more specifically to the drawings, reference numeral 10 is used to generally designate the combination granary and livestock feeder. This feed handling structure 10 has, in FIG. 1, been illustrated within a barn-like protective enclosure 12, although its use is not necessarily so limited.

The structure 10 is to be of modular construction capable of, through the use of prefabricated side sections 14 and end sections 16, being formed of any desired length and width.

Figure 8:
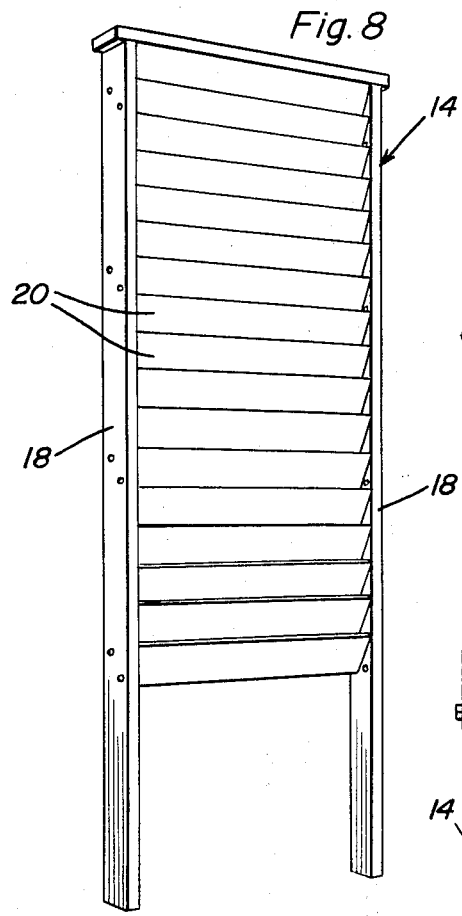
FIG. 8 is a perspective view of one of the side wall forming sections.
Figure 5:
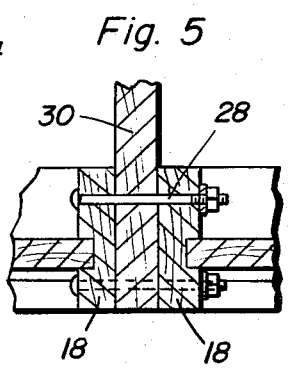
FIG. 5 is an enlarged cross-sectional detail taken substantially on a plane passing along line 5—5 in FIG. 2.

With reference to FIG. 8 in particular, it will be appreciated that each side section 14 is formed of a pair of opposed upright side posts 18 and a plurality of transverse inclined louvers 20 which extend between the posts 18 in overlapping relation to each other from the upper ends of the posts 18 to a point sufficiently above the lower ends of the posts 18 so as to allow free access for livestock thereunder. The particular arrangement of the louvers 20 will be appreciated from FIG. 4. The end sections 16 are similarly constructed, generally differing only in that the lower portions thereof are boarded solid, as at 21, to form a grain tight end. The posts and louvers of end sections 16 are respectively designated by reference numerals 24 and 26.

Figure 6:
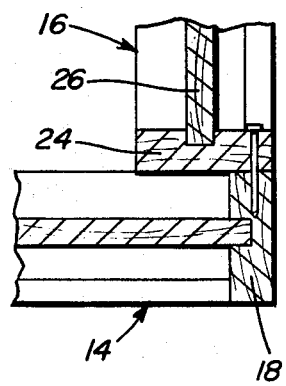
FIG. 6 is an enlarged cross-sectional detail taken substantially on a plane passing along line 6—6 in FIG. 2 and illustrating the corner construction of the structure.

In assembling the sections 14 and 16 so as to define the elongated bin-like enclosure, the corners are initially formed, noting FIG. 6, by directly nailing the corner forming side and end sections to each other. Next, the side sections, for the length of the structure 10, are bolted together by elongated bolts 28 extending through preformed apertures formed in the adjoining vertical side section posts 18. In addition, in order to provide transverse stability to the structure, cross beams 30 will normally be bolted to and between each adjoining pair of posts 18 with these beams transversely spanning the interior of the formed bin in a manner so as to enable the opposed ends of each beam 30 to be received between and bolted to opposed pairs of posts 18. Any reasonable number of vertically spaced cross beams 30 can be provided between each pair of adjoining posts 18 and the transversely opposed pair of posts.

Figure 4:
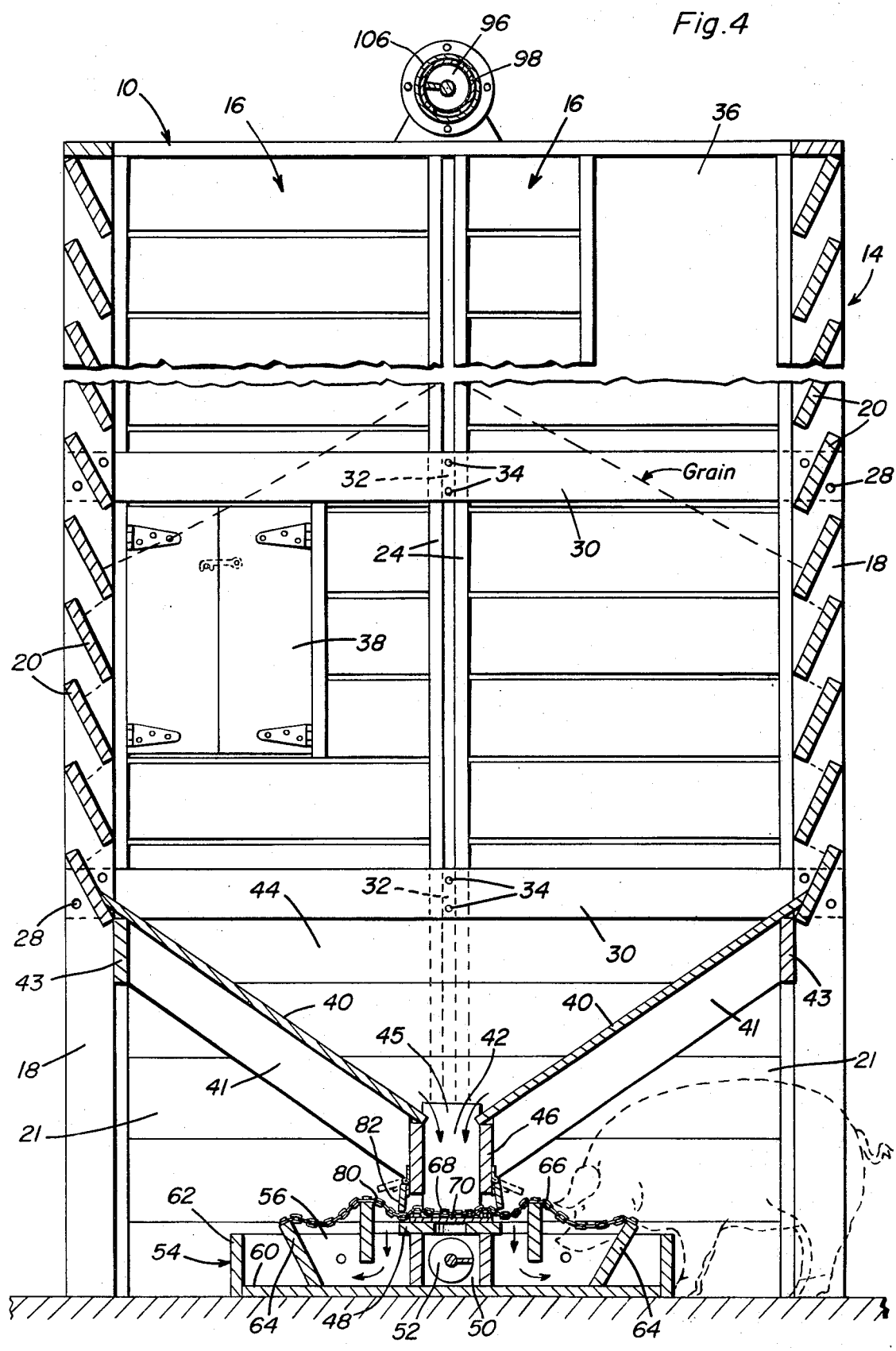
FIG. 4 is an enlarged vertical cross-sectional view taken substantially on a plane passing along line 4—4 in FIG. 2.

With reference to FIGS. 2 and 4, bracing beams 32 are also provided between the end sections 16 and the first vertically aligned set of cross or bracing beams 30. These bracing beams 32 have the outer ends thereof bolted between the adjoining posts 24 of the end sections 16 with the inner ends of the beams 32 being affixed by bolts, screws, or the like 34 to the cross beams 30.

As will be appreciated, the length and width of the structure can easily be varied by the removal or introduction of sections as desired. By the same token, the entire structure can easily be dismantled for movement and reassembled at a new site.

It is also contemplated that selective ones of the end sections 16 be provided with access openings therethrough, the upper openings 36 will normally be retained open, while closure panels 38 will normally be provided on the lower access openings to preclude the flow of feed therethrough.

The bottom of the formed granary or bin is defined by substantially full length opposed inwardly and downwardly sloping floor sections 40 resting on inclined floor supports 41. Noting FIG. 4 in particular, these opposed sloping floor sections 40 have an outer edge approximately at the lower level of the louvers of the side sections 14 and inner edges at a substantially lower level centrally of the formed granary and in laterally spaced relation to each other so as to define a full length feed discharge channel 42. The upper ends of the floor supports 41 are fixed to 2 × 8 beams 43 fixed to the inside of posts 18 along the length of the bin. The lower ends of supports 41 are fixed to opposed 2 × 10 beams 46 also extending along the length of the bin. The opposed ends of the bottom structure can also be provided with inwardly and downwardly sloping floor sections 44 if so desired.

The feed discharge channel 42 is defined by the pair of opposed 2 × 10 vertical beams 46 provided along the opposed inner edge portions of the side floor sections 40. Spacers 45 are utilized between beams 46 at spaced points therealong and extend 1½ inches above the beams 46 and 3 inches below beams 46. The lower edges of these beams 46 are spaced above a horizontal beam or member 48 which constitutes the top of an elongated box-like structure 50 which in turn receives a full length feed gathering auger 52. This box-like structure 50 fits centrally within an elongated feed trough 54 which, as will be best appreciated from FIG. 3, can be formed of individual sections 56 bolted together, as at 58, so as to define a trough 54 which corresponds in length to that of the overall feed handling structure 10. The auger 52 and auger receiving box 50 of course extends continuously through the trough sections 56 for purposes which shall be explained presently.

The trough 54, or more particularly each of the trough sections 56, is provided with a bottom 60, opposed vertical side walls 62 and inner upwardly and outwardly inclined side retaining walls 64 inwardly spaced from the side walls 62. The inclined walls 64 retain the feed and cooperate with the side walls 62 in properly positioning the livestock during feeding while at the same time providing easy access to the feed. A baffle or guard board 66 extends lengthwise along each trough section 56 in outwardly opposed relation to each side of the horizontal board or member 48 with the upper edge of each baffle or guard board 66 being orientated above the member 48 and approximately at the level of the lower edges of the channel defining boards 46. The lower edges of the baffle boards 66 are orientated below the horizontal member 48 and substantially above the bottom of the trough section 56 so as to allow for a free movement of the feed therebeneath.

In use as a feeder, the grain, corn, or the like will feed downwardly and inwardly along the opposed sloping floor sections 40 through the feed discharge channel 42 onto the horizontal member 48 and laterally off the opposed sides thereof into the trough sections 56 for access thereto by the livestock.

In the feed handling structure 10, provision is also made for use as a granary with the stored feed being discharged in bulk therefrom. The gathering of the feed for discharge is basically done by the bottom conveying auger 52. Movement of the feed into the auger box 50 is effected through a series of relatively large openings 68 provided at spaced points along the horizontal beam or member 48. Each opening 68 has a flat plate or plate-like gate 70 lying thereover and pivotally fixed, as at 72, to the member 48 at a point outward of the opening 68 for sliding movement between a first position closing the opening 68 and a second position outwardly swung therefrom. It is contemplated that all of the gates 70 be operated simultaneously. As such, an elongated linked control rod 74 interconnects each of the gates 70, normally at the corner diametrically opposed from the pivotal mounting 72 of each gate with the linked control rod 74 terminating in an outwardly projecting manually graspable handle 76. The last one of the gates 70, that is the gate furthest from the manual handle 76, is resiliently biased toward the adjoining end wall by appropriate means, such as the illustrated coiled tension spring 78 so as to normally maintain the gates 70 in a position closing the openings 68. If so desired, appropriate means can be provided for locking the control rod in its pulled position so as to selectively maintain the openings 68 exposed for the free flow of feed therethrough.

In order to prevent a bridging of the feed, and so as to maintain a free flow thereof either through the openings 68 or into the trough 54, a series of link chains 80 are affixed to the upper edges of the opposed retaining walls 64 and span the horizontal member 48 in overlying relation thereto. These chains 80 will normally have a slight degree of slack therein so as to, under the influence of the discharging feed, provide a continuous flexing motion which in turn contributes to the free flowing of the feed. As will be best appreciated from FIG. 3, each of the chains 80 will centrally overlie one of the openings 68 with the corresponding gate 70 operating therebeneath.

When the feed is moving into the feed transporting box 50, a pair of side flaps or panels 82, hinged to the outer faces of the opposed channel defining beams 46, are pivoted downwardly so as to generally close the gap between the lower edges of the beams 46 and the top of the member 48. When the structure is used for the feeding of livestock, that is by the introduction of feed into the trough 54, the side panels 82 are swung upwardly and retained in an upwardly swung position in any suitable manner. By the same token, when swung downwardly so as to confine and direct the feed to the auger 52, appropriate means would also be used to secure the panels in this position.

A motor 83 or similar power drive means is operatively engaged with one end of the bottom gathering auger 52. The opposite end of the auger 52 is directly communicated with the lower end of a vertical stack 84 in which a vertical end discharge auger 86 is operatively positioned. The drive for the auger 86 is designated by reference numeral 88 and is normally operatively engaged with the auger 86 at the upper end of the stack 84. This auger 86 vertically lifts feed introduced into the lower end of the stack by auger 52 upwardly to an outwardly and downwardly inclined discharge chute 90 with the flow therethrough being controlled by an appropriate valving unit 92 operable from ground level by an elongated control rod 94. In this manner, feed from the feed handling structure 10 can be easily and effectively removed therefrom.

Feed is initially introduced into the conveyor by a centrally located full length top distributing auger 96 located within a corresponding tubular housing 98. The auger 96 generally parallels the bottom auger 52 and is provided with a power driving means 100 at the far end thereof. The second end of the auger 96, and the associated surrounding tube 98 is directly communicated with the upper end of the stack 84 above the discharge chute 90. Feed is preferably introduced into the auger tube 98 for distribution along the granary by a hopper 102 communicated with the tube 98 at the end thereof adjacent the upper portion of the stack 84. As will be appreciated, by a reverse driving of the augers 96 and 86, the feed can actually be moved directly from the hopper 102 through the tube 98 and upper portion of the stack 84 to the discharge chute 90. However, in normal operation, the feed will be distributed along the length of the granary for storage therein and subsequent distribution either to the feed trough 54 lying thereunder or, through the augers 52 and 56 to the discharge chute 90.

Figure 7:
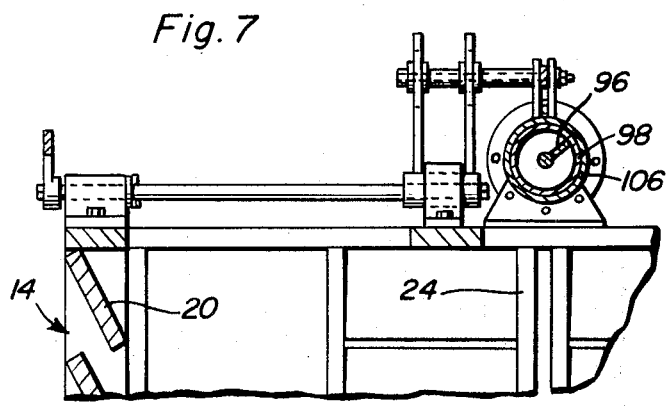
FIG. 7 is an enlarged cross-sectional detail taken substantially on a plane passing along line 7—7 in FIG. 2.

As will be appreciated, the auger housing 98 includes a series of discharge openings 104 therethrough equally spaced along the length of the granary. In order to provide for a selective closing of these openings 104, shiftable tubular sections 106 surround the auger housing 98 with these sections or sleeves 106 having apertures 108 therein. These apertures, in one position of the sleeves, align with the housing apertures 104 so as to allow the free passage of feed therethrough and, in a shifted position, are offset from the openings 104 so as to preclude discharge of feed into the bin. One means of effecting a shifting of the flow controlling sleeves or sections 106 has been illustrated in FIGS. 2 and 7 and consists basically of a series of interconnected pivoted links controlled from ground level by an appropriate manual handle 110. Set up in the manner illustrated in the drawings, all of the feed passing apertures 104 are simultaneously controlled. However, if so desired, a series of control units can be provided along the length of the bin, one associated with each sleeve 106 for an individual control thereof. In this manner, a more exact discharge of the feed as desired along the length of the bin can be effected.

With reference to FIG. 2, a grain tight wall 107 can be placed between every three sections to facilitate storing different grains. This wall can be formed by placing 2 inch lumber between sections from top to bottom with the lower pieces bolted in place and the upper pieces resting thereon.

While not specifically illustrated, aerators can be permanently or temporarily mounted within the formed bin for facilitating a drying of the feed should such be required.

From the foregoing, it will be appreciated that a highly unique combination granary and livestock feeder has been defined. This construction while incorporating all of the desired aspects of a grain storage construction, is also uniquely adapted for a direct feeding of livestock therefrom. The arrangement of the grain controlling augers enables a flow of the feed as desired. In fact, while not noted supra, the intercommunicating orientation of the augers actually enables a movement of the feed from the bottom of the bin through the vertical stack 84 and then back along the top of the bin for redistribution should such be necessary so as to properly maintain the condition of the feed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A feed handling structure comprising an upright elongated feed receiving bin, an elongated longitudinally extending feed discharge at the bottom of said bin for the downward discharge of feed from the bin, a feed moving conveyor in spaced underlying relation to said feed discharge, a livestock feeding trough also underlying said feed discharge, and means alternatively communicating said feed discharge with said feed moving conveyor or said feeding trough.

2. The structure of claim 1 including a horizontal member overlying said feed moving conveyor, said trough being located to the opposite sides of said feed moving conveyor whereby feed falling on said member will flow laterally into said trough.

3. The structure of claim 2 wherein said means alternatively communicating the feed discharge with the feed moving conveyor or the feeding trough comprises a series of openings through said horizontal member for enabling passage of feed from the feed discharge to the underlying feed moving conveyor, and a movable plate overlying each opening and selectively movable between a first position closing said opening whereby feed will flow laterally into the trough and a second position exposing the opening whereby feed will flow therethrough into the feed moving conveyor.

4. The structure of claim 3 including movably mounted panels for selectively restricting outward flow of feed from said member into said trough.

5. The structure of claim 4 including a vertically orientated feed baffle located within the trough in outwardly spaced relation to each side of the horizontal member.

6. The structure of claim 5 including a series of flow encouraging flexibly moving members extending transversely across said horizontal member and generally aligned with the openings formed therethrough to preclude any tendency for flowing feed to jam.

7. The structure of claim 6 including a vertically extending feed conveyor communicated with the first mentioned feed moving conveyor at one end thereof for the reception of feed therefrom, and an outwardly directed discharge chute affixed to and communicated with the vertically extending feed conveyor toward the upper end thereof.

8. The structure of claim 7 including a feed distributing conveyor overlying said bin and extending longitudinally therealong, one end of said distributing conveyor being directly communicated with the upper end of the vertically extending feed conveyor.

9. The structure of claim 8 wherein saids bin is defined by a series of prefabricated vertically elongated louvered sections and means releasably bolting said sections in side-by-side relation to each other.

10. The structure of claim 1 including a vertically extending feed conveyor communicated with the first mentioned feed moving conveyor at one end thereof for the reception of feed therefrom, and an outwardly directed discharge chute affixed to and communicated with the vertically extending feed conveyor toward the upper end thereof.

11. The structure of claim 10 including a feed distributing conveyor overlying said bin and extending longitudinally therealong, one end of said distributing conveyor being directly communicated with the upper end of the vertically extending feed conveyor.

12. The structure of claim 1 wherein said bin is defined by a series of prefabricated vertically elongated louvered sections and means releasably bolting said sections in side-by-side relation to each other.

* * * * *